United States Patent
Kulas

(10) Patent No.: US 8,412,021 B2
(45) Date of Patent: Apr. 2, 2013

(54) VIDEO PLAYER USER INTERFACE

(75) Inventor: Charles J. Kulas, San Francisco, CA (US)

(73) Assignee: Fall Front Wireless NY, LLC, Dover, DE (US)

( * ) Notice: Subject to any disclaimer, the term of this patent is extended or adjusted under 35 U.S.C. 154(b) by 1543 days.

(21) Appl. No.: 11/777,257

(22) Filed: Jul. 12, 2007

(65) Prior Publication Data

US 2008/0285940 A1 Nov. 20, 2008

Related U.S. Application Data

(60) Provisional application No. 60/938,704, filed on May 18, 2007.

(51) Int. Cl.
  *H04N 9/80* (2006.01)
  *H04N 5/92* (2006.01)
(52) U.S. Cl. .................................. 386/239; 386/245
(58) Field of Classification Search .................. 386/225, 386/239, 245, 240, 241, 244, 248
See application file for complete search history.

(56) References Cited

U.S. PATENT DOCUMENTS

| 5,699,107 | A  | * | 12/1997 | Lawler et al. | 725/58 |
| 7,624,337 | B2 | * | 11/2009 | Sull et al. | 715/201 |
| 7,877,689 | B2 | * | 1/2011 | Gilley | 715/723 |
| 7,983,526 | B2 | * | 7/2011 | Ando et al. | 386/240 |
| 2008/0034295 | A1 | | 2/2008 | Kulas | |
| 2008/0184121 | A1 | | 7/2008 | Kulas | |

OTHER PUBLICATIONS

U.S. Appl. No. 11/499,315, filed Aug. 4, 2006.
U.S. Appl. No. 11/669,901, filed Jan. 31, 2007.

* cited by examiner

*Primary Examiner* — Robert Chevalier

(57) ABSTRACT

A video playback user interface includes display of tags or other information outside of a video play area. Tags can be visually associated with items in the video by using connectors such as lines, arrows, etc. that bridge between a tag and an item. Tag and other information can be included with a video file or associated with a video file and stored as a separate file or other data structure. Users can add text or other annotations for viewing at a later time or by other users. A snapshot of a video frame during playback can be obtained and sent to an email address, web site, storage device, or other destination. The snapshot includes a video frame or portion of a frame along with added information such as tags, annotations, etc.

20 Claims, 7 Drawing Sheets

VIDEO PLAYER USER INTERFACE

CROSS-REFERENCE TO RELATED APPLICATION

This application claims priority from Provisional U.S. Patent Application 60/938,704 entitled "VIDEO PLAYER USER INTERFACE", filed May 18, 2007, by Charles J. Kulas, and which is incorporated herein by reference for all purposes.

This application is related to co-pending U.S. patent application Ser. No. 11/499,315 filed on Aug. 4, 2006 entitled "DISPLAYING TAGS ASSOCIATED WITH ITEMS IN A VIDEO PLAYBACK" which is hereby incorporated by reference as if set forth in this application in full for all purposes.

This application is also related to co-pending U.S. patent application Ser. No. 11/669,901 filed on Jan. 31, 2007 entitled "AUTHORING TOOL FOR PROVIDING TAGS ASSOCIATED WITH ITEMS IN A VIDEO PLAYBACK" which is hereby incorporated by reference as if set forth in this application in full for all purposes.

SUMMARY OF EMBODIMENTS OF THE INVENTION

In particular embodiments, a video playback approach is provided for accommodating tags associated with relatively small video play areas. Tags can include text and/or graphics and a pointer or other mechanism for associating a tag to an item and/or video frame in a video sequence. The video playback approach can receive inputs from a user via an on-screen or other suitable user interface. Also, video frames may be formatted with tag coordinate or other tag related information to facilitate video playback. In addition, a snapshot feature can allow users to review one or more video frames at a later time.

In one embodiment, a method can include: receiving a video file header in a video player of a computing device, the video file header providing tag contents; receiving a video frame, the video frame having tag information; and generating tags using the tag contents and the tag information, the tags being displayed in a region outside an area of the video player.

In one embodiment, an apparatus can include: a video player in a computing device, where the video player can receive a video file header that provides tag contents, and a video frame having tag information; and logic encoded in one or more tangible media for execution, and when executed operable to generate tags using the tag contents and the tag information, where the tags can allow for display in a region outside an area of the video player.

DETAILED DESCRIPTION OF EMBODIMENTS OF THE INVENTION

Figure 1:
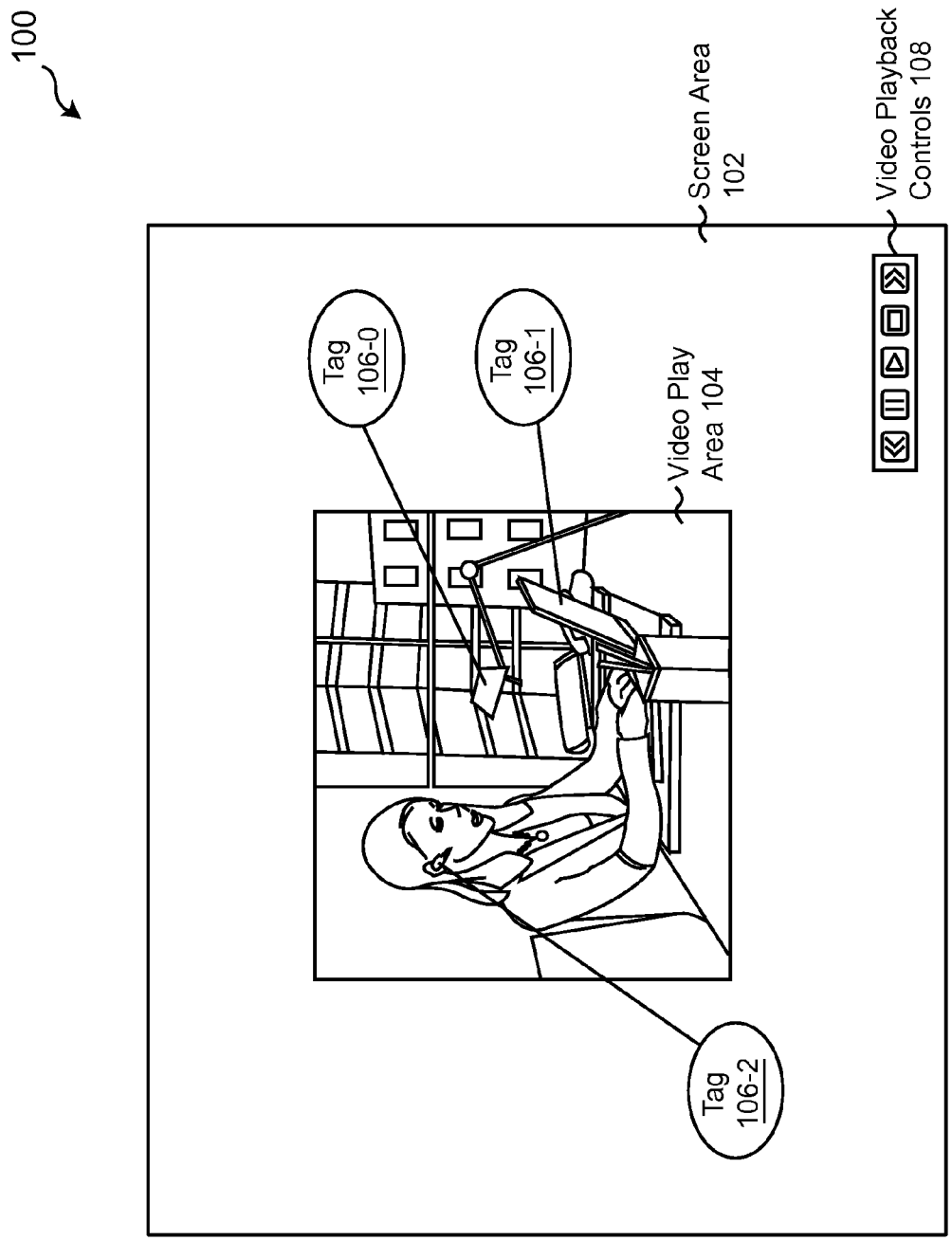
FIG. 1 shows an example video playback positioning within a screen area of a computing device.

One approach to product placement includes providing additional information, such as text, graphics or other information, in association with an item in a video scene or frame. The information can be in the form of a "tag" that can be shown in a tag mode that is selectable by a viewer by using a control, such as a television remote control unit. Such an approach is described, for example, in the co-pending patent applications referenced above.

Tags can provide information about items, and the tags may be visible during video playback, during a broadcast video program, during video play on a computer platform, or via other types of video playing or presentation. Tags can identify a brand name, item name, location where an item can be purchased, and/or additional information about the item. A preferred tag design includes a connector such as a line, arrow, pointer, etc. between a tag and an item in the video to which the tag is associated. Various features presented herein allow for tag displaying on a computing device having a relatively small video play area within a larger display area, such as where a video is played back in a window that is smaller than a display screen displaying the window. Or where the video is played back in a window in a web page viewed with a web browser, in a region of an interface of an application, etc. In cases where there is additional display area available outside of the video play area, information such as tags can be included in the additional display area. The tags can be associated with items in the video display area by using a connector from the vicinity of a tag to the vicinity of an item in the video to which the tag relates.

A typical form of video playback for a user or viewer can include use of any computing device, such as a digital video disc (DVD) player, or a personal digital assistant (PDA), or other suitable device. Further, a multi-angle feature of the player may be used to allow a viewer to switch between tagged and non-tagged playback. In normal or non-tagged playback, tags may not be visible, and an original video sequence (e.g., a television program, movie, etc.) can be played in typical fashion. However, when a viewer presses a button, a new video sequence that includes tags may be selected. The new video sequence can be synchronized to an original video sequence so that the effect can be that tags appear over continuous action of the original video sequence. The viewer can turn off the tags by selecting an original sequence, for example. Other forms or mechanisms for playback can be used to achieve the same or a similar effect.

Tags can be organized and displayed according to categories, such as "design," "gadgets," "scene," or any other suitable category. For example, the design category can display tags that deal with fashion, interior/exterior decorating, architecture, art, and similar types of items. The gadgets category can include electronics, appliances, cars, etc., and the scene category can provide information on colors, furniture, plants, locations, climate, or the like. Other categories can be created, as desired, and tags of a specific category can be selected for independent display. Alternatively, categories can be combined to display tags from multiple categories on a same display.

Referring now to FIG. 1, an example video playback positioning within a screen area of a computing device is shown and indicated by the general reference character 100. Screen area 102 may be larger than video play area 104 and/or video play area 104 may be relatively small for reading tags (e.g., 106-0, 106-1, and 106-2). In addition, video playback controls 108 can be utilized by a user for controlling video playing. In particular embodiments, connectors such as continuous lines may cross the boundary between screen area 102 and video play area 104 to associate a tag with an item in the video. Such connectors can be drawn by using coordinates or known locations of the tag and item, or by utilizing "join points" defined by information within or associated with the video. The join points can identify an area in the video to which an external connector can map in order to complete a connector path from a tag to an item. For example, a join point (or segment, or area) can be specified at an edge of the video window and the video, itself, can provide a connector portion from the join point to the item. A video player, such as an application program executed by a computer, can provide another portion of the connector path that runs from the join point to the desired tag. Associations of join points with items can be provided to the application so that the application can control the tag placement, content, color, size, and other characteristics, up to the join point. Join segments can also be used to define a join line segment so that, instead of a line, a connector with substantial thickness can be used at the join boundary.

In particular embodiments, an application can allow for video overlay of tag information (e.g., tags 106-0, 106-1, and 106-2, and associated lead lines) in connection to join points. Further, it should be understood that even though a single frame of video is shown in video play area 104, particular embodiments operate while the video is playing back in real time, or in a slower or faster mode to successively display many frames to achieve animation, as is known in the art. Pausing or still-framing the video is also possible, as are various types of standard transport controls, such as frame skipping, jogging, etc.

In this particular example, video play area 104 shows an image of a woman in an office typing at a laptop at her desk while she is also talking on a wireless phone. Further, the video can play with animation and sounds, as is known in the art. Although particular embodiments are discussed primarily with respect to video presentations, any suitable type of visual presentation and/or other types of media can be adapted for use with particular embodiments. For example, video, animations, movies, pre-stored files, slide shows, Flash™ animation, etc., can be used with features of particular embodiments. In addition, the number and type of attributes or other data included in an associated tag database can vary, as desired. Tag or other information can be placed at the beginning, middle or end of a video file. The inclusion of tag or other information embedded into or included in or with a video file is not necessary in all embodiments. For example, data can reside in a separate file, database or other structure separately from a video file to which the data is associated. The data can be obtained from a remote server, or from local storage, during, near or at a time of playing back the video.

In addition, any type of playback device (e.g., computer system, set-top box, DVD player, PDA, cellular phone, etc.), image format (e.g., Motion Picture Experts Group (MPEG), Quicktime™, audio-visual interleave (AVI), Joint Photographic Experts Group (JPEG), motion JPEG, etc.), display method or device (e.g., cathode ray tube (CRT), plasma display, liquid crystal display (LCD), light-emitting diode (LED) display, organic light-emitting display (OLED), electroluminescent, etc.) can be utilized in accordance with particular embodiments. Further, any suitable source can be used to obtain playback content, such as a DVD, HD DVD, Blu-Ray™ DVD, hard disk drive, video compact disk (CD), fiber optic link, cable connection, radio-frequency (RF) transmission, network connection (e.g., to a server), etc. In general, the audio/visual content, display and playback hardware, content format, delivery mechanism and/or other components and properties of the system can vary, as desired, and any suitable items and/or characteristics can be used in particular embodiments.

In FIG. 1, example tags are shown with text boxes 106-0, 106-1, and 106-2, and associated lead lines or "pointers." Such text boxes can include information relevant to an item that is pointed at by the lead line. For example, a particular tag may state "Filo Armlight www.filolghts.com" to point out the manufacturer ("Filo"), model ("Armlight"), and website (www.filolights.com) relating to the light to which that tag is connected via its lead line. Other tags can provide information about other items in the frame.

Alternatively, or in addition, text boxes or tags can include any information about an item in a frame, information about the frame itself, or other suitable information. Accordingly, tag information may be amenable to social networking/commentary, or other such applications. Thus, tags can include any type of interesting or useful information about an item, about other characteristics of the image frame, and/or about a video sequence to which the image frame belongs. In general, any type of information can be included in each tag, as desired. Further, tags can be organized into any number of different categories that can be selectively displayed.

Tag shape, color, position, animation, size, use of a pointer, logo, or other graphic, are some of the tag characteristics that can be modified. Many different factors can affect these tag characteristics. If a specific factor, such as aesthetics, is given priority, then a graphic artist or scene coordinator can be used to match the look and behavior of tags to a theme of a scene or overall presentation. For example, where a scary movie is tagged, the tag design can be in darker colors with borders having cobwebs, blood, ritual symbols, etc., while for a science fiction episode, the tags can be made to look futuristic.

If an advertising factor is given priority, then tags from a preferred sponsor (e.g., someone who is paying more for advertising) can be presented in bolder text, brighter colors, made larger, or made to overlap on top of other tags, etc. Further, an associated tag database or server can be utilized to store tag information, such as priority, tag coordinate information, video file header information, or other suitable attribute information for each tag.

Figure 2:
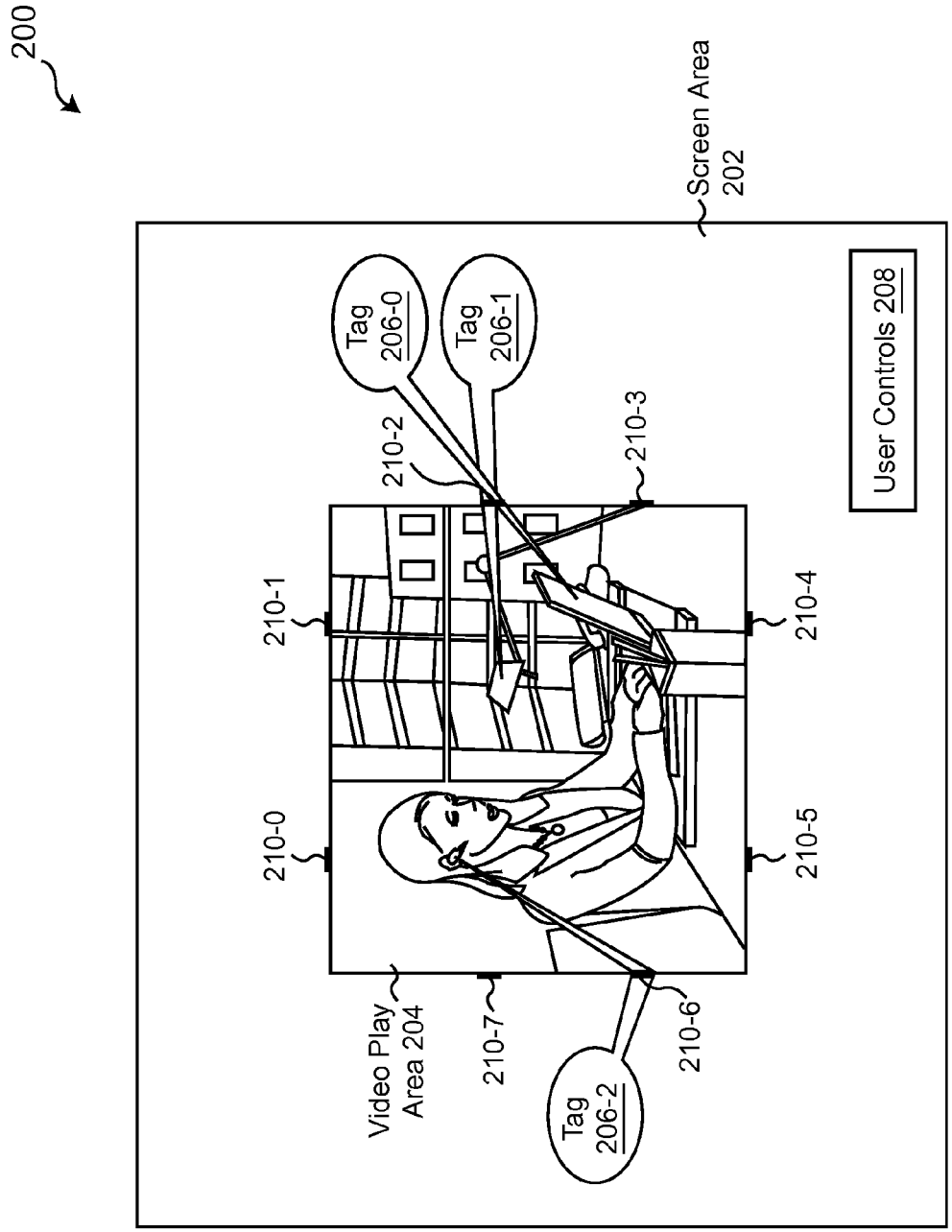
FIG. 2 shows an example of tags connecting to join segments for video playback.

Referring now to FIG. 2, an example of tags connecting to items via a join point or segment is shown and indicated by the general reference character 200. For example, video play area 204 can be smaller than additional screen area 202. Here, video stream embedding can essentially extend to the boundary between video play area 204 and additional screen area 202. Application programming can allow for the coupling of tags (e.g., 206-0, 206-1, and 206-2) or text boxes to "join" points or "segments" (e.g., 210-0, 210-1, 210-2, 210-3, 210-4, 210-5, 210-6, and 210-7). For example, a text box for tag 206-2 can be coupled to video play area 204 via join segment 210-6. Similarly, a text box for tag 206-0 can couple to join segment 210-2 in one video frame, while tag 206-1 can utilize join segment 210-2 to point to a different item in a subsequent video frame. Further, user controls 208 can control various aspects related to tags, items, frames, etc., for the video being played.

In particular embodiments, the boundary region, as well as connections to join points or segments, can be represented in any programming language, such as Flash, XML, Java, etc. Join segment information, such as locations and on/off indications for each frame, can be supplied to the application supporting the video playback. This join segment, as well as tag content, information can be specified at the beginning of a video when the video is loaded. Alternatively, or in addition, the segment and/or tag information can be supplied in advance of video loading. For this case, coordinates of items for tagging, and/or active join segment identification can be defined prior to loading to facilitate the application programming.

In one embodiment, users may also add or originate information in by, e.g., entering text into the text boxes. The annotations can be attached to a video (e.g., either with the video file, itself; uploaded to a server for playback with a copy of the video, etc.) and viewed by the same or a different user at different devices and/or times. Accordingly, users can tailor video playback as desired using additional screen area 202 outside of video play area 204, or by using the video play area (e.g., having the tags reside in the video window). Information other than in tags can be added as, for example, text, images or symbols anywhere on the video or screen area.

Figure 3:
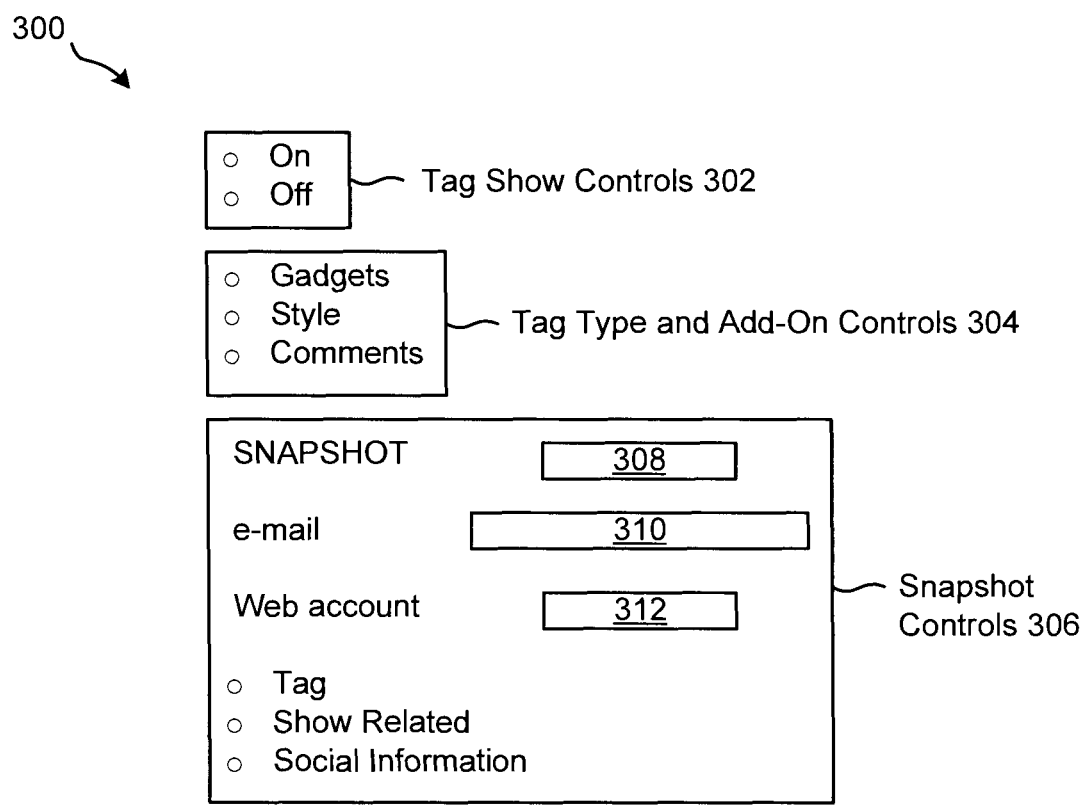
FIG. 3 shows an example user interface for video playback including tags.

Referring now to FIG. 3, an example user interface for video playback including tags is shown and indicated by the general reference character 300. Tag show controls 302 can include on/off to enable or disable the showing of tags during playback of one or more frames of the video. Tag type and add-on controls 304 can include types of tags (e.g., gadgets, style, etc.), as well as comments that may be provided by the user.

Particular embodiments can include video playback utilizing a format that includes tags, where a portion of the playback data includes the tag content, as well as where the tags appear. Further, the application hosting the video can receive coordinates of the tags, and/or updates of video tags from a server (e.g., if a price changes). In addition, particular embodiments can support social networking applications (e.g., reviews of certain products), where an application hosting the video can be a social networking site, and may also utilize the "comments" control (e.g., 304).

Particular embodiments can also utilize "snapshot" or "poster" controls 306 for creating a snapshot/poster of a particular video frame, which may include tag, related, and/or social information or comments. Snapshot controls 306 can include snapshot button 308, which a user can press during video playback in order to capture a particular video frame. Thus, if a user is watching a video and the user may have interest in a particular tagged product therein, but the user does not wish to stop the video during the playback, snapshot button 308 can simply be pressed for image capture. In addition, e-mail field 310 can be supplied to give an address to which the snapshot may be mailed, as will be discussed in more detail below. Also, web account 312 can specify another option for sending, or utilizing the snapshot. For example, web account 312 can indicate a social networking site.

In particular embodiments, a snapshot or poster can be provided based on a predetermined sequence of frames or interval of playback time, referred to as a "bin." For example, a bin can include a plurality of frames, and a poster can be accessed (e.g., in pre-rendered form from an associated server) when snapshot button 308 is pressed for any frame within that bin. Then, instead of providing the exact frame on which the snapshot button is pressed, a predetermined poster or other image corresponding to the bin in which the selected frame resides can be provided. The poster or other image can be in any desirable format, resolution, design, arrangement or have any desired characteristics that can be the same as or different from the video that was the subject of the snapshot. This approach can accommodate high-density (HD) video applications, or any other applications where a frame of original video may not be clear, representative, or otherwise artistically pleasing or desirable for use as a snapshot.

Figure 4:
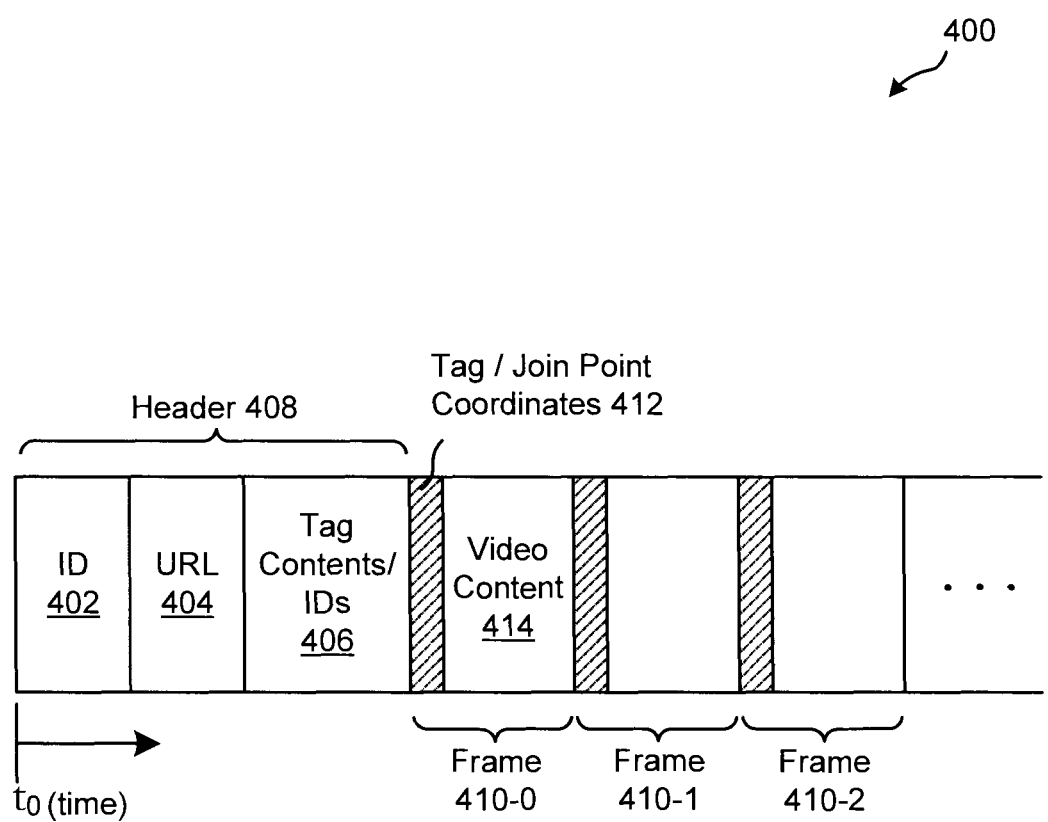
FIG. 4 shows an example video frame format.

Referring now to FIG. 4, an example video frame format is shown and indicated by the general reference character 400. In this example, time can move from left to right, as indicated. Thus, header 408 may precede a video content portion, and can include identification (ID) 402, universal resource locator (URL) 404, and tag content/IDs 406. Generally, header 408 can specify particular formats, as well as which join points/segments may be active in each frame. URL 404 can represent a server site for obtaining tag information.

Each frame (e.g., 410-0, 410-1, 410-2, . . . ) can include a tag/join point coordinates portion 412, and a video content portion 414. Generally, video can include ID 402, URL 404, tag contents 406, as well as coordinates (e.g., 412) for tags for each frame (e.g., 410-0). In this fashion, the picture data can be formatted as normal. Tags may be moved on the display screen in real-time, and such control may be included in the video frame format in advance. Accordingly, tag data can be interspersed with the actual video information. Further, video file 400 can be implemented in any suitable format, such as MPEG (e.g., MPEG Part 10), and/or utilizing auxiliary data portions of H.264, or advanced video coding (AVC).

Accordingly, a tag display position for an end-user can be derived via pre-stored coordinates that may be associated with frames in the video sequence input to a video player. Each such coordinate set can be associated with a particular tag by using a tag ID number, tag name, or other suitable identification or means. In general, previously captured coordinates can be saved in association with the frames to which they correspond. Such coordinate capture can include tag location on a video play area, and where a pointer or a lead line ends on the video play area (e.g., at a join point or segment).

Figure 5:
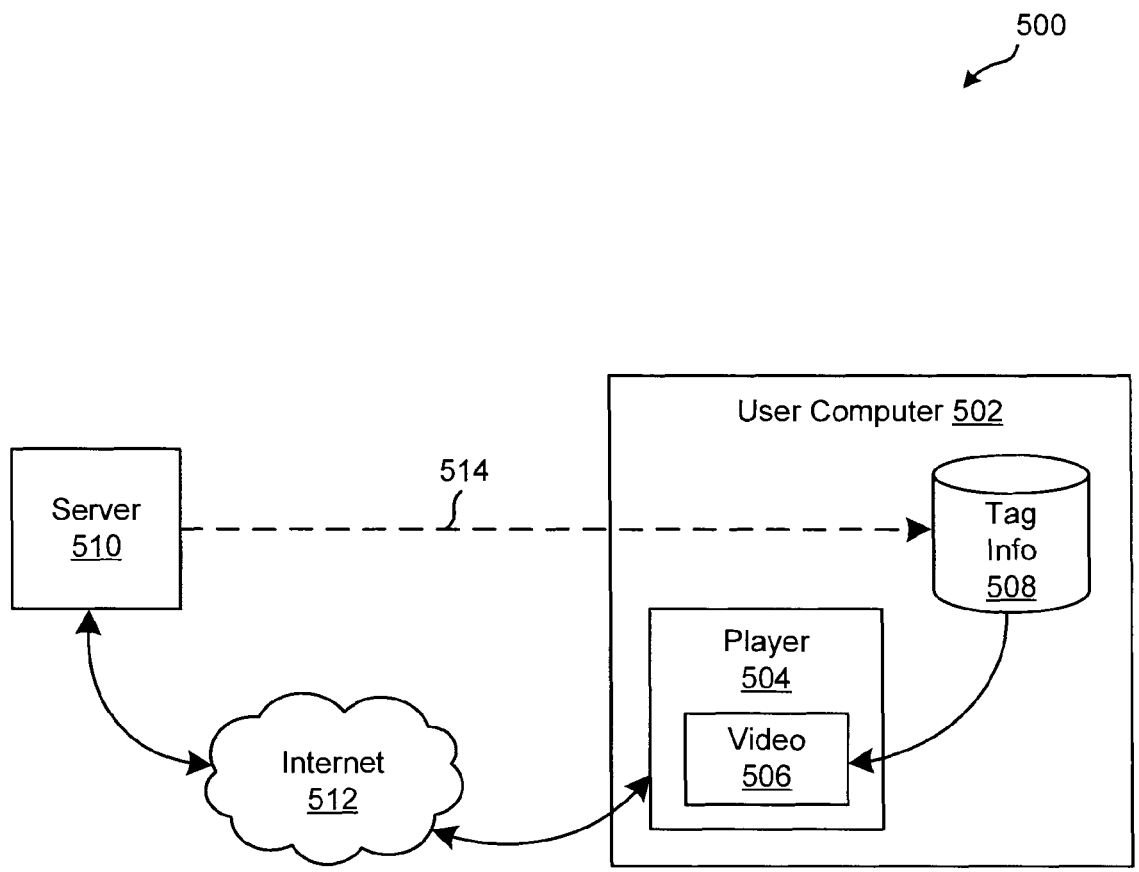
FIG. 5 shows an example system for obtaining tag information.

Referring now to FIG. 5, an example system for obtaining tag information is shown and indicated by the general reference character 500. A user computer 502 can include player 504 with video play area and/or screen 506, as well as storage 508 for tag information. Internet 512, or any suitable network (e.g., a virtual private network (VPN), wireless network, local area network (LAN), etc.), can be utilized to access server 510. Server 510 may then provide information 514, such as header and coordinate information, or other tag information, as well as a pre-rendered poster shot for a bin, for computer 502. As discussed above, the URL (e.g., 404 of FIG. 4) found in the header of the video file can point to server 510. Tag information 514 can then be utilized by player 504 during video playback.

In particular embodiments, Flash may be used as the video player, and Flash Video (FLV) may be the format for the video. However, other embodiments can use any suitable applications, formats, standards, programming languages, or other ways to provide the disclosed functionality. Player 504 can use the FLV formatted video to generate text boxes, bubbles, etc., corresponding to tags. Accordingly, the Flash player can utilize FLV formatted video, and then determine where to put the bubbles and/or text boxes therefrom. Thus, the formatted video frames can specify how big the join points/segments are, where they are located, and which ones are active per frame. Further, data for the tags can be defined in the header, or determined from the server (e.g., 510). In addition, such tag content can also include comments about products or frames for others to see, without actual product information contained therein.

Particular embodiments can provide a way to point to something in a video or other media format graphically, and may not necessarily include tags specifically about a product and/or item in the video. Thus, such graphical pointing in particular embodiments can include anything about a particular frame, such as the name of a restaurant, a view out the window, messed-up hair of an actor, or general comments about a particular scene, etc. In addition, tags may be user-selectable, so the user can turn them on/off by utilizing a tag icon (e.g., tag show controls 302 in FIG. 3) on the screen. Thus, the user can filter the viewing of advertising-based tag icons, as well as utilize tag-like mechanisms for non-advertising applications (e.g., social networking, or other user commenting).

Also in particular embodiments, a snapshot option (e.g., see snapshot controls 306 in FIG. 3) can allow for a snapshot of the video, and forwarding of that snapshot via an e-mail account/password. For example, if a user is going along and watching a video, that user may not want to buy a tagged product right then, but perhaps the user may want a reminder about that product, or another aspect of the video frame, for later viewing or revisiting. In this fashion, a user may utilize a button (e.g., snapshot button 308 in FIG. 3), or some other initiation mechanism, such as a "Shift-Alt-Click" sequence or a designated hotkey, to invoke such a snapshot. Many other types of destinations for the snapshot are possible, such as to a web site, hard drive storage location, text message, attachment to an email or other message, etc.

Figure 6:
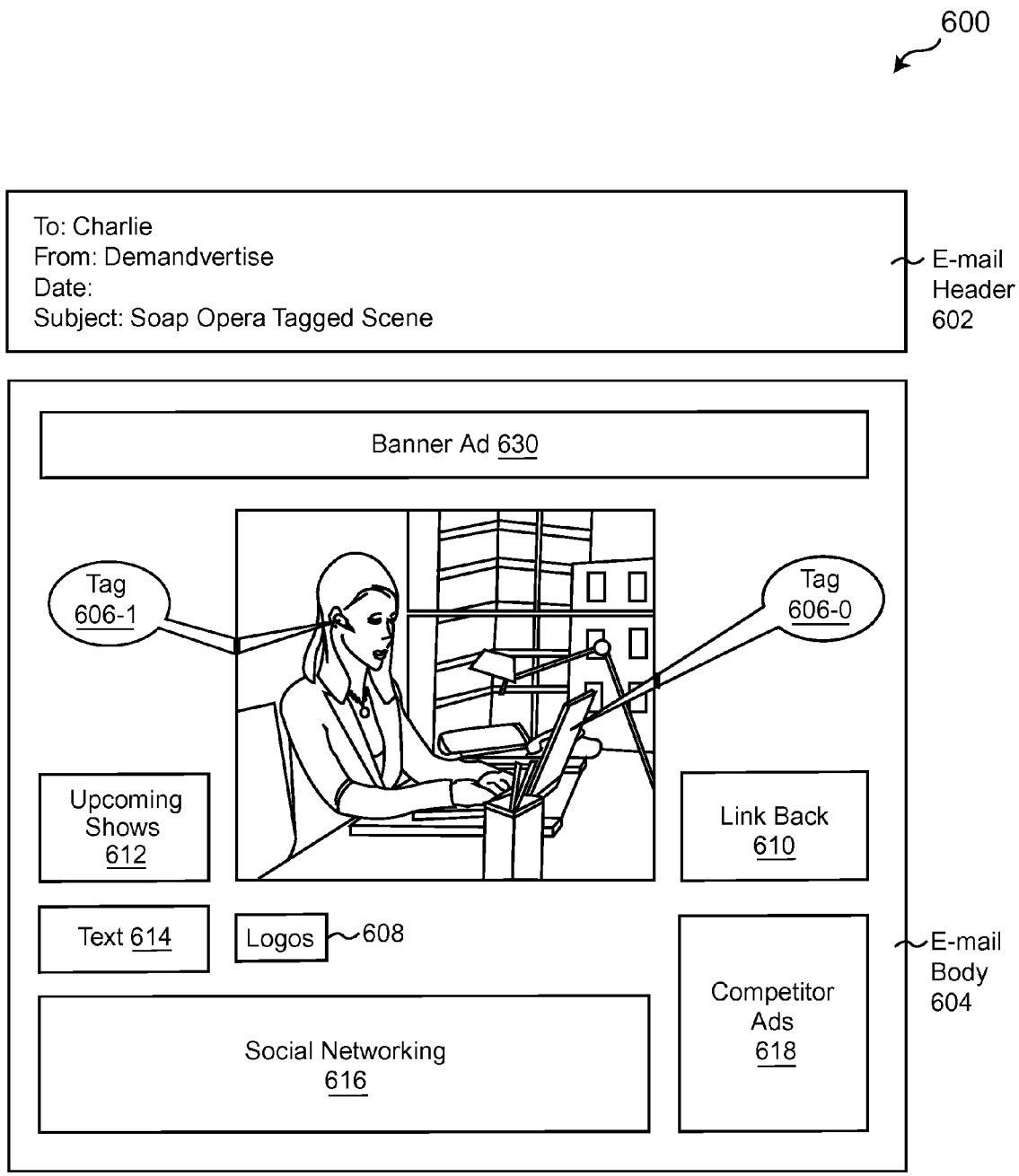
FIG. 6 shows an example snapshot feature e-mail.

Referring now to FIG. 6, an example snapshot feature e-mail is shown and indicated by the general reference character 600. E-mail header 602 can include typical to, from, date, and subject fields. E-mail body 604 can include details of a snapshot, as well as other associated information. For example, e-mail body 604 can include tags 606-0 and 606-1 for the exact frame corresponding to the snapshot, as shown. Also, the snapshot can include logos 608, banner ad 630 above the video play area, and upcoming shows 612. The user can also turn on or off tagging in the snapshot view. In addition, advertising for competitors (e.g., competitor ads 618) can be included for products in which the user may be interested. Also, notes, etc., from friends may be included (e.g., text 614), as well as social networking 616 information, which can include text and/or pictures related to various products.

In enabling the snapshot while viewing video (e.g., by utilizing button 308 in FIG. 3), an indication of the snapshot taking place can be provided to the user. Such indications may include a noise (e.g., a beep or click sound), and/or a flash on the screen. Generally, the snapshot picture may be taken and sent to the user via e-mail without substantial interruption of ongoing video playback. In this fashion, a user may be watching a movie on a cell phone, but the viewing area may be too small to see tags anyway, so the user can simply look up the information later on a home computer via the snapshot feature. In addition, link back option 610 can essentially link to the frame in the snapshot, with additional playing of a video portion (e.g., several frames, or a predetermined play time period) before and/or after the snapshot frame in the video.

Figure 7:
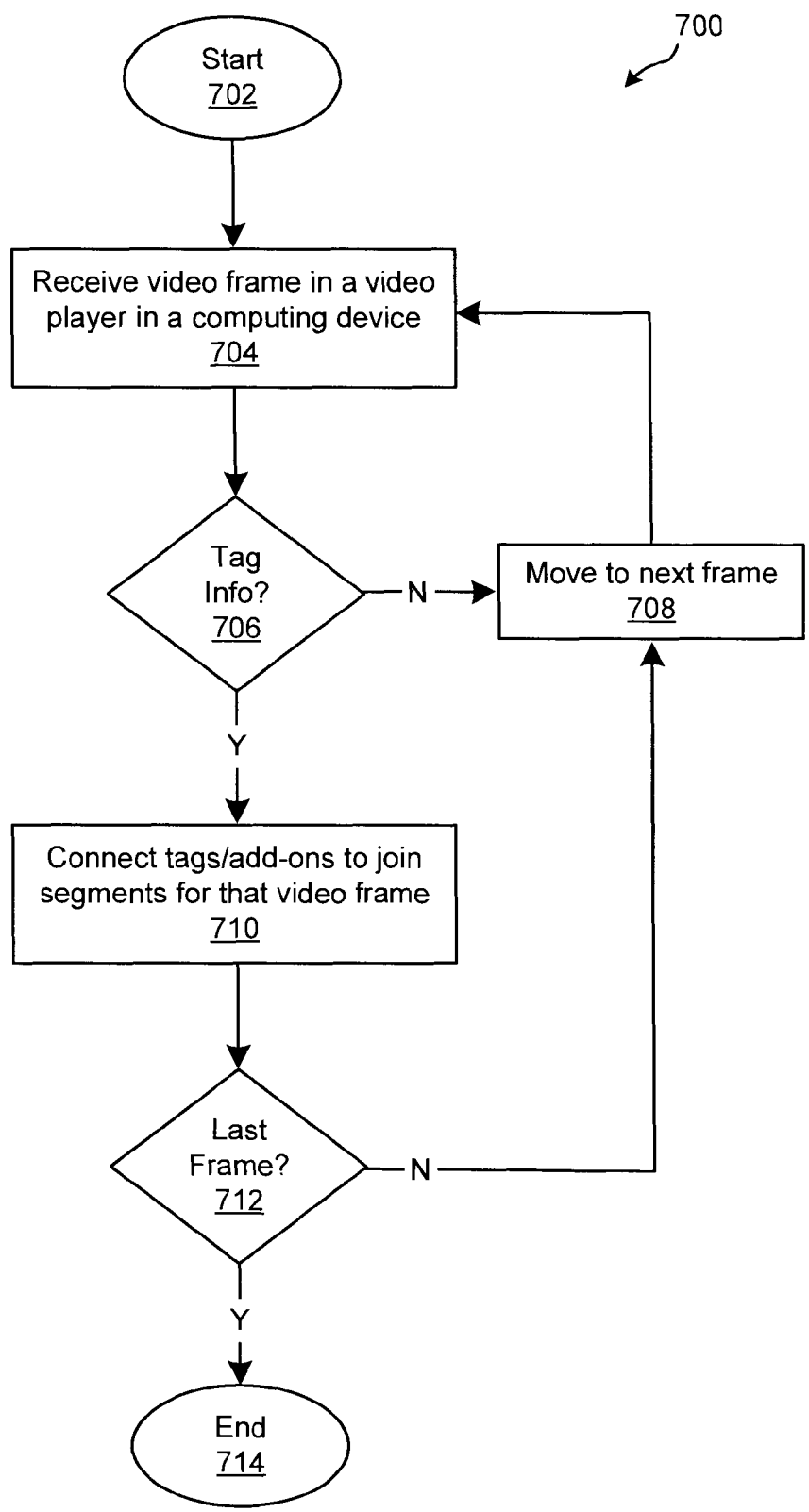
FIG. 7 shows a flow diagram of an example method of video playback with tags.

Referring now to FIG. 7, a flow diagram of an example method of video playback with tags is shown and indicated by the general reference character 700. The flow can begin (702), and a computing device with a video player can receive a video frame (704). If the video frame does not contain tag information (706), the next frame can be accessed (708), and that frame can be received in the video player (704). However, if the video frame contains tag information (e.g., in an auxiliary portion 412 as shown in FIG. 4), the tag/add-ons can be connected to join segments for that video frame (710). If there are more frames (712), a next frame can be accessed (708). However, if the last frame has been accessed (712), the flow can complete (714).

Many other types of hardware and software platforms can be used to implement the functionality described herein. For example, the video player can be included in a portable device such as a laptop, PDA, cell phone, game console, e-mail device, etc. In such a system, many or substantially all of the components shown in FIG. 5 might be included in a single device. In other approaches, one or more of the components of FIG. 5 can be separable or remote from the others. For example, the tag data can reside on a storage device, server, or other device that is accessed over another network. In general, the functions described can be performed by any one or more devices, processes, subsystems, or components, at the same or different times, executing at one or more locations.

Accordingly, particular embodiments can provide for computer playback of video that supports automatically capturing of screen snapshots, in the accommodation of tag information outside of a video play area. Further, while particular examples have been described herein, other structures, arrangements, and/or approaches can be utilized in particular embodiments.

Any suitable programming language can be used to implement features of the present invention including, e.g., C, C++, Java, PL/I, assembly language, etc. Different programming techniques can be employed such as procedural or object oriented. The routines can execute on a single processing device or multiple processors. The order of operations described herein can be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations.

For example, a processor can perform its functions in "real time," "offline," in a "batch mode," etc. Portions of processing can be performed at different times and at different locations, by different (or the same) processing systems.

Reference throughout this specification to "one embodiment," "an embodiment," "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," "in a particular embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Further, distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method, comprising:
    displaying a video in a video play area on a display screen, wherein the display screen includes an additional area that is not used to display the video, wherein a boundary separates the video play area from the additional area;
    displaying text information at least partially in the additional area; and
    displaying a connector to visually associate the text information with an item in the video, wherein the connector comprises a join point that specifies a portion of the boundary through which the connector passes.

2. The method of claim 1, wherein the text information is associated with coordinates specifying where the text information is placed on the display screen.

3. The method of claim 1, further comprising:
    receiving a video signal containing data representing the video and the text information.

4. The method of claim 3, wherein the video signal further contains the join point.

5. The method of claim 4, wherein the data contained in the video signal comprises a header, and wherein the text information and the join point are contained in the header.

6. The method of claim 1, wherein the connector comprises a first line segment connecting the text information to the join point and a second line segment connecting the join point to the item in the video.

7. The method of claim 1, further comprising:
    receiving a user input to provide a snapshot of a frame in the video.

8. The method of claim 7, further comprising:
    causing the snapshot to be sent to an email destination.

9. The method of claim 7, further comprising:
    linking the snapshot using a web account.

10. The method of claim 7, wherein the snapshot comprises a link back mechanism for replaying a predetermined number of preceding and/or subsequent video frames around the snapshot.

11. An apparatus comprising:
    a processor configured to be operatively connected to a display, the processor configured to:
        cause display of a video in a video play area on a display screen, wherein the display screen includes an additional area that is not used to display the video, wherein a boundary separates the video play area from the additional area;
        cause display of text information at least partially in the additional area; and cause display of a connector to visually associate the text information with an item in the video, wherein the connector comprises a join point that specifies a portion of the boundary through which the connector passes.

12. A processor-readable storage device on which are stored one or more instructions executable by a processor, the one or more instructions comprising:
   instructions to display a video in a video play area on a display screen, wherein the display screen includes an additional area that is not used to display the video, wherein a boundary separates the video play area from the additional area;
   instructions to display text information at least partially in the additional area; and
   instructions to display a connector to visually associate the text information with an item in the video, wherein the connector comprises a join point that specifies a portion of the boundary through which the connector passes.

13. The method of claim 1, wherein the text information is part of a tag.

14. The method of claim 13, wherein the tag is an advertisement for the item in the video.

15. The method of claim 1, further comprising:
   accepting an input from a user specifying a location of the text information in the additional area; and
   repositioning the text information to the location without altering the video.

16. The apparatus of claim 11, wherein the connector comprises a first line segment connecting the text information to the join point and a second line segment connecting the join point to the item in the video.

17. The apparatus of claim 11, wherein the join point facilitates placement of the text information anywhere in the additional area without affecting the video.

18. The apparatus of claim 11, wherein the item in the video is associated with the join point and the join point is associated with a location of the text information but the item in the video is not directly associated with the location of the text information.

19. The processor-readable storage device of claim 12, on which are additionally stored a video signal comprising data representing the video, the text information, a location of the text information, and the join point, wherein the join point is associated with both the item in the video and the location of the text information.

20. The processor-readable storage device of claim 19, wherein the video signal is formatted without regard to the location of the text information.

* * * * *

UNITED STATES PATENT AND TRADEMARK OFFICE
CERTIFICATE OF CORRECTION

| | | |
|---|---|---|
| PATENT NO. | : 8,412,021 B2 | Page 1 of 1 |
| APPLICATION NO. | : 11/777257 | |
| DATED | : April 2, 2013 | |
| INVENTOR(S) | : Kulas | |

It is certified that error appears in the above-identified patent and that said Letters Patent is hereby corrected as shown below:

In the Drawings

In Fig. 5, Sheet 5 of 7, in Box "508", delete "Tag Info" and insert -- Storage --, therefor.

In the Specification

In Column 3, Line 64, delete "video compact disk (CD)," and insert -- video compact disk (VCD), --, therefor.

In Column 4, Line 9, delete "www.filolghts.com"" and insert -- www.filolights.com" --, therefor.

Signed and Sealed this
Twentieth Day of August, 2013

Teresa Stanek Rea
*Acting Director of the United States Patent and Trademark Office*